United States Patent
Asano et al.

(10) Patent No.: US 6,757,477 B1
(45) Date of Patent: Jun. 29, 2004

(54) SET TOP BOX WHICH ENABLES TELEVISION PROGRAM DISPLAYED ON A TELEVISION SET TO BE RECORDED BY MEANS OF A VIDEO RECORDER

(75) Inventors: Makoto Asano, Vienna (AT); Werner Blümel, Vienna (AT); Franz Kuchar, Vienna (AT); Adolf Proidl, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/568,280

(22) Filed: May 10, 2000

(30) Foreign Application Priority Data

Nov. 5, 1999 (EP) .............................. 99890151

(51) Int. Cl.[7] ................................................ H04N 5/91
(52) U.S. Cl. ........................................ 386/46; 725/141
(58) Field of Search ............................... 386/1, 46, 94, 386/125; 725/39, 80, 133, 141, 153; 348/552, 553, 705, 706

(56) References Cited

U.S. PATENT DOCUMENTS 6,002,394 A * 12/1999 Schein et al. .................. 725/39
6,266,480 B1 * 7/2001 Ezaki et al. .................... 386/94
6,289,169 B1 * 9/2001 Okuyama ..................... 386/46
6,304,714 B1 * 10/2001 Krause et al. ............... 386/125

FOREIGN PATENT DOCUMENTS

WO    9710682 A1    3/1997

* cited by examiner

*Primary Examiner*—Thai Tran
*Assistant Examiner*—Christopher Onuaku

(57) ABSTRACT

A processor for analog and digital audio, video, and control information has analog connections to supply analog A/V signals and output control information to a television set. At the beginning of a recording mode in the DVHS video recorder, when an A/V signal (which may be a processed digital reception signal) of a television program just being displayed on the television set is applied to the television set, the signal is supplied to the DVHS video recorder as an A/V signal via an analog connection and/or as digital A/V data via a digital connection. An A/V signal of a television program being displayed on the television set and supplied by its tuner is transferred from one analog connection to another analog connection from the beginning of a recording mode in the DVHS video recorder, as a result of which the A/V signal is recorded by the DVHS video recorder.

7 Claims, 1 Drawing Sheet

SET TOP BOX WHICH ENABLES TELEVISION PROGRAM DISPLAYED ON A TELEVISION SET TO BE RECORDED BY MEANS OF A VIDEO RECORDER

BACKGROUND OF THE INVENTION

The invention relates to a processing arrangement s defined in the opening part of claim 1.

A processing arrangement of the type defined in the opening part of claim 1 is known from the document WO 97/10682 and takes the form of a set top box. The known set top box is connected to a television set by means of two cable connections adapted to be connected to first analog connection means of the set top box, the cable connections enabling analog audio and video information to be transferred. A composite video signal can be applied to the television set via one of these cable connections and a component video signal can be applied to the television set via the other cable connection. The component video signal contains more picture information than the composite video signal, which is why it is possible to display television pictures of a higher quality by means of a component video signal applied to the television set than by means of a composite video signal applied to the television set.

The set top box is connected to a DVHS video recorder by a cable connections adapted to be connected to second analog connection means and digital connection means of the set top box. Via the second analog connection means an analog composite video signal and via the digital connection means digital A/V data A/D and control data containing audio, video and control information can be applied to the DVHS video recorder. The DVHS video recorder is adapted to record and reproduce analog A/V signals in accordance with the VHS standard and digital A/V data in accordance with the DVHS standard.

The known DVHS video recorder further has OSD generator means adapted to generate and supply text information for on-screen display as A/V information. In addition, the DVHS video recorder has an OSD insertion stage by means of which an A/V signal generated by the OSD generator means can be inserted into an A/V signal reproduced by the DVHS video recorder or applied to the DVHS video recorder via its analog connection means, in order to insert the on-screen display information generated by the OSD generator means into video information for the joint display of said information by means of the television set.

The known DVHS video recorder can be employed in accordance with two possibilities of use in order to insert on-screen display information into video information reproduced as A/V data in the digital reproducing mode of the DVHS video recorder and jointly display said information by means of the television set.

A satellite antenna is connected to the set top box to supply analog and digital reception signals to the set top box. The set top box includes decoding means by which digital reception signals are decoded in order to supply them as an analog composite video signal or as an analog component video signal to transfer means of the set top box. The transfer means are adapted to transfer information applied to connection means of the set top box to other connection means of the set top box.

By actuation of keys of the set top box a user of the set top box can choose which information applied to the connection means of the set top box is to be displayed by the television set or is to be recorded or reproduced by the DVHS video recorder. In order to use the higher quality component video signal for the display of television pictures by means of the television set when both a component video signal and a composite video signal are available, the component video signal itself forms output control information that characterizes the supply of the component video signal by the first connection means in the known set top box.

The known television set has switching means which, when output control information is present, process the component video signal, and not a composite video signal which may be supplied by the first connection means, in order to display television pictures by means of the television set.

The known set top box has the disadvantage that when the DVHS video recorder is set to a recording mode the A/V signal or the A/V data of the television program being displayed by the television set is not automatically recorded by the DVHS video recorder. This disadvantage occurs when via the second analog connection means an A/V signal or via the digital connection means A/V data is applied to the DVHS video recorder of another television program than supplied to the television set via the first analog connection means in order to be displayed by means of the television set. Moreover, this disadvantage may arise when the DVHS video recorder has been set to record an A/V signal supplied by a tuner of the DVHS video recorder or the television set displays a television program of an A/V signal supplied by a tuner of the television set, which signal is not supplied to the television set by the first analog connection means. In each of these cases the A/V signal or A/V data of another television program than desired by the user is recorded by the DVHS video recorder, which is a major disadvantage.

SUMMARY OF THE INVENTION

It is an object of the invention to provide a processing arrangement in which the afore-mentioned disadvantages are avoided. In a processing arrangement of the type defined in the opening part of claim 1 this object is achieved by means of the measures defined in the characterizing part of claim 1.

Thus, it is achieved that at the beginning of a recording mode in the DVHS video recorder, when an A/V signal of a television program just being displayed on the television set is applied to the television set by the first analog connection means, this signal, which may be a processed digital reception signal, is supplied to the DVHS video recorder as an A/V signal via the second analog connection means and/or as digital A/V data via the digital connection means. On the other hand, an A/V signal of a television program being displayed on the television set and supplied by a tuner of the television set is transferred from the first analog connection means to the second analog connection means by the transfer means from the beginning of a recording mode in the DVHS video recorder, as a result of which it is achieved that this A/V signal is recorded by means of the DVHS video recorder.

The measures defined in claim 2 yield the advantage that a DVHS video recorder can supply recording mode information in the form of digital control data to the processing arrangement via the digital connection means, which recording mode information indicates whether analog or digital recording by the DVHS video recorder is possible or required, for which reason a user of the set top box need not enter this information manually by means of keys of the set top box.

The measures defined in claim 3 yield the advantage that a television program to be recorded by means of the DVHS video recorder can be supplied to the DVHS video recorder by the set top box as an analog A/V signal or as digital A/V in accordance with recording mode information, so as to enable a corresponding recording.

The measures defined in claim 4 yield the advantage that by means of its digital connection means the set top box can be connected to a multitude of DVHS video recorders because the IEEE 1394 standard is already broadly accepted.

The measures defined in claim 5 yield the advantage that by means of its first and second analog connection means the set top box can be connected to a multitude of DVHS video recorders and television sets because substantially any video recorder and any television set has at least one SCART connector.

BRIEF DESCRIPTION OF THE DRAWING

The invention will be described in more detail hereinafter with reference to the Figure which shows an embodiment given by way of example, to which the invention is not limited.

DESCRIPTION OF THE PREFERRED EMBODIMENTS

Figure 1:
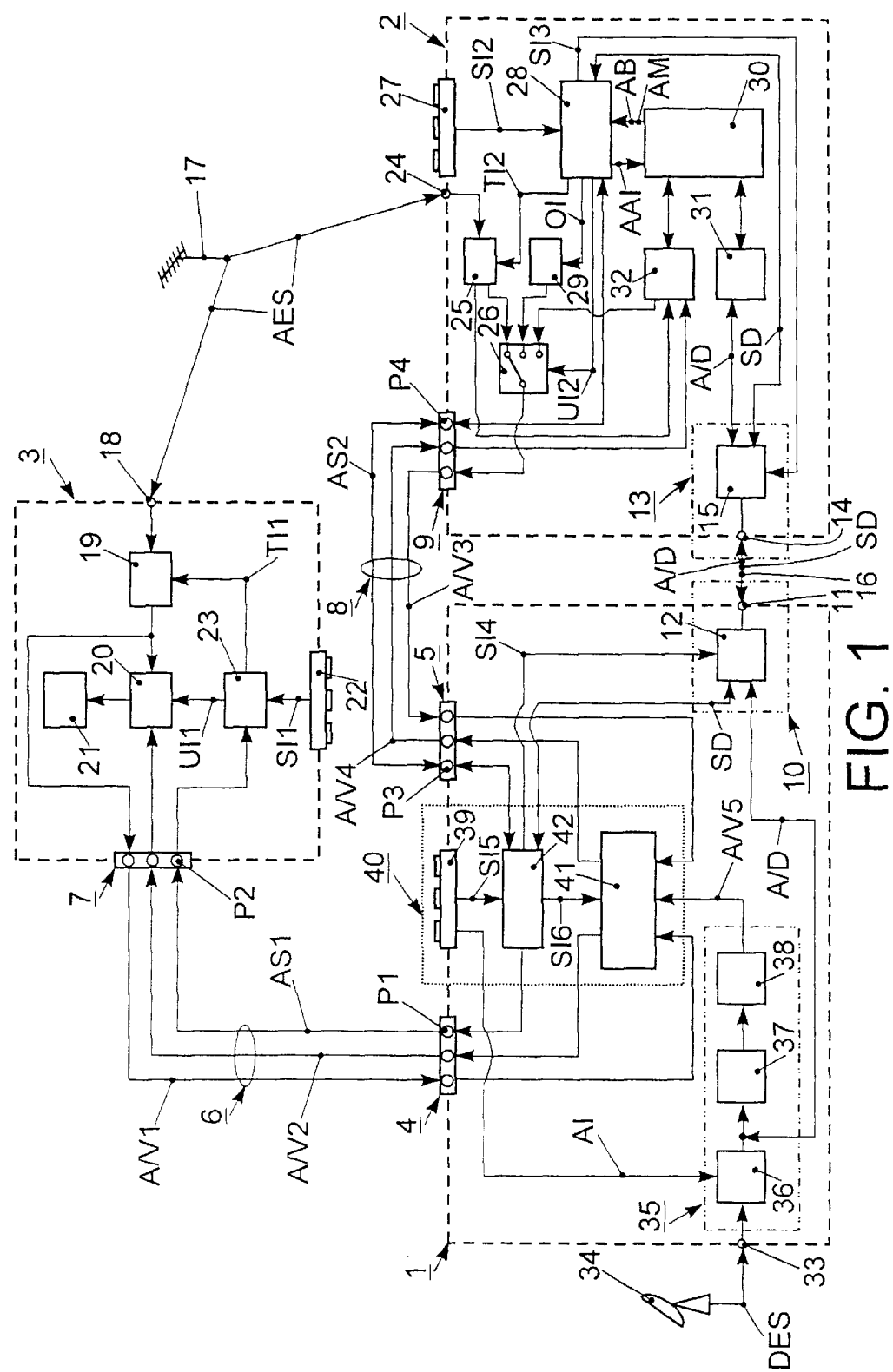
FIG. 1 is a block diagram which shows a video recorder, a television set and a set top box, which are connected to one another by cable connections which can be connected to analog connection means and digital connection means for the transfer of analog A/V signals, digital A/V data and output control information.

FIG. 1 shows a block diagram of a set top box 1, which forms a processing device, a video recorder 2, which forms a reproducing arrangement, and a television set 3. The set top box 1 is adapted to process and to transfer analog and digital audio, video and control information. For this purpose, the set top box 1 includes first analog connection means 4 and second analog connection means 5, via which analog A/V signals and output control information can be applied to the set top box 1 and supplied by the set top box 1.

The first analog connection means 4 of the set top box 1 are connected to third analog connection means 7 of the television set 3 via a cable connection 6. The second analog connection means 5 of the set top box 1 are connected to fourth analog connection means 9 of the video recorder 2 via a cable connection 8.

The analog connection means 4, 5, 7 and 9 comply with a SCART standard (EN 500 49-1, EN 501 57-2-1, -2, -3) which is commonly used in electronic consumer equipment. The SCART standard defines cable connections having up to 21 lines, of which FIG. 1 symbolically shows only three lines for the cable connections 6 and 8. A first A/V signal A/V1 which contains audio information and video information can be supplied from the television set 3 to the set top box 1 via a line of the cable connection 6. Thus, an A/V signal may be formed by a so-called composite video signal or a so-called RGB video signal. A second A/V signal A/V2 can be supplied from the set top box 1 to the television set 3 via a further line of the cable connection 6. A third A/V signal A/V3 can be supplied from the video recorder 2 to the set top box 1 via a line of the cable connection 8 and a fourth A/V signal A/V4 can be supplied from the set top box 1 to the video recorder 2 via a further line of the cable connection 8.

The SCART standard further defines output control information, which corresponds to a voltage level of 4.5–12 V on a pin 8 of analog connection means, the pin 8 being the eighth connector terminal of the analog connection means. The analog connection means do not supply any output control information in the absence of the voltage level of 4.5–12 V on the pin 8 of the analog connection means. The connector terminals of the first analog connection means 4 include a pin 8 P1 connected to a pin 8 P2 of the connector terminals of the third analog connection means 7 via a line of the cable connection 6. First output control information AS1 can be applied from the set top box 1 to the television set 3 via this line of the cable connection 6.

The connector terminals of the second analog connection means 5 include a pin 8 P3 connected to a pin 8 P4 of the connector terminals of the fourth analog connection means 9 via a line of the cable connection 8. Second output control information AS2 can be applied from the set top box 1 to the video recorder 2 or from the video recorder 2 to the set top box 1 via this line of the cable connection 8.

The set top box 1 further has first digital connection means 10 via which digital A/V data A/D and control data SD can be applied to the set top box 1 and can be supplied by the set top box 1. For this purpose, the first digital connection means 10 include a first digital connector 11 and first data bus means 12.

The video recorder 2 further has second digital connection means 13 which include a second digital connector 14 and second data bus means 15. The first digital connector 11 of the set top box 1 is connected to the second digital connector 14 of the video recorder 2 via a cable connection 16. The first data bus means 12 of the set top box 1 are adapted to establish a digital data bus connection to the second data bus means 15 of the video recorder 2 in accordance with the IEEE-1394 standard (IEEE Std 1394-1995, SH94364; IEC 61883; AV/C Digital Interface Command Set). Likewise, the second data bus means 15 are adapted to establish a data bus connection to the first data bus means 12 in accordance with the IEEE-1394 standard.

The IEEE-1394-standard defines a transmission protocol in accordance with which both an isochronous and an asynchronous data transfer is possible over the same cable c connection 16. During the isochronous data transfer A/V data AD which contain digital audio information and video information can be transmitted in a specified time frame. A/V data A/D then include, for example, an MPEG transport stream in accordance with the MPEG standard (MPEG standard (system): ISO/IEC 13.818/1). During an asynchronous data transfer control data SD can be transmitted at arbitrary instants.

The video recorder 2 can transmit, for example, beginning-of-recording information AB to the set top box 1 as control data SD, which information AB characterizes the beginning of a recording mode in the video recorder 2. The video recorder 2 can further transmit recording mode information AM to the set top box 1 as control data SD, which information AM characterizes a digital recording mode or analog recording mode which is possible for the recording of information by means of the video recorder 2.

An analog reception signal AES from a terrestrial antenna 17 can be applied to the television set 3 via a first antenna terminal 18. The television set 3 has a first tuner 19, to which the analog reception signal AES can be applied. An A/V signal available from the tuner 19 can be applied as a first A/V signal A/V1 to the third analog connection means 7 and to a first A/V signal processing stage 20. Furthermore, a second A/V signal A/V2 applied to the third analog connection means 7 via the cable connection can be applied to the first A/V signal processing stage 20. The first A/V signal processing stage 20 is adapted to process an A/V signal applied to it and to apply a processed A/V signal to a monitor 21.

The video information contained in an A/V signal applied to the monitor 21 can be displayed by means of the monitor 21, which information may also include so-called on-screen display information. The monitor 21 further has a loudspeaker for the acoustic reproduction of audio information contained in an A/V signal applied to the monitor 21.

The television set 3 further has a first keyboard 22 by means of which a user of the television set 3 can apply first control information SI1 to first control means 23 of the television set 3. By the actuation of a channel-up and a channel-down key of the first keyboard 22 the user can then control the first tuner 19 in order to select a television program desired by the user, whose A/V signal is contained in the analog reception signal AES, and display it by means of the monitor 21. The first control means 23 can supply corresponding first tuner information TI1 to the first tuner 19.

Furthermore, first output control information AS1 applied to the pin 8 P2 on-screen display the third analog connection means 7 can be supplied to the first control means 23. The first control means 23 are adapted to supply first switching information UI1 to the first A/V signal processing stage 20 when the set top box 1 supplies first output control information AS1 to the first control means 23 of the television set 3. The A/V signal processing stage 20 is adapted to supply a processed second A/V signal A/V2 to the monitor 21 when first switching information UI1 appears in the first A/V signal processing stage 20. The A/V signal processing stage 20 is adapted to apply a processed first A/V signal A/VSI, supplied by the first tuner 19, to the monitor 21 in the absence of first switching information UI1 in the A/V signal processing stage 20.

Consequently, the monitor 21 displays a television program received as an A/V signal in the analog reception signal AES when the set top box 1 does not supply first output control information AS1 to the television set 3. Conversely, the monitor 21 displays a television program transmitted to the television set 3 as a second A/V signal A/V2 by the set top box 1 when the set top box 1 supplies first output control information AS1 to the television set 3.

An analog reception signal AES supplied by the terrestrial antenna 17 can further be applied to a second antenna terminal 24 of the video recorder 2. The video recorder 2 has a second tuner 25 to which the analog reception signal AES from the second antenna terminal 24 can be applied. An analog reception signal AES processed in the tuner 25 can be applied to a switching stage 26 as an A/V signal. The A/V signal supplied by the tuner 25 can be applied to the fourth analog connection means 9 by the switching stage 26 as a third A/V signal A/V3.

For the activation of modes of operation and for the entry of control information by a user the video recorder 2 has a second keyboard 27. By means of the second keyboard 27 second control information SI2 can be applied to second control means 28 of the video recorder 2. The second control means 28 can supply second tuner information TI2 to the second tuner 25 in order to select an A/V signal of a television program desired by the user and contained in the analog reception signal AES.

The video recorder 2 further has OSD generator means 29 for generating OSD information and for supplying generated OSD information as an A/V signal. OSD information may include textual information and graphic information. On-screen display for example enables textual information received as teletext information or information stored in a video recorder to be displayed in addition to the content of a magnetic-tape cassette which has been loaded into the video recorder.

The OSD generator means 29 are adapted to generate on-screen display information which fills the whole display area of the monitor 21. The second control means 28 can supply OSD activation information OI to the OSD generator means 29. OSD activation information OI may include, on the one hand, an on-screen display identification stored in the OSD generator means 29 or, on the other hand, textual information and graphic information in order to generate a corresponding on-screen display with the aid of the OSD generator means 29.

When a user of the video recorder 2 actuates a corresponding key of the second keyboard 27 in order that the video recorder 2 supplies on-screen display information in the form of a third A/V signal A/V3, the control means 29 supply corresponding OSD activation information OI to the OSD generator means 29. An A/V signal which is subsequently supplied by the OSD generator means 29 and which contains the on-screen display information can be applied to the switching stage 26. Second switching information UI2 supplied by the second control means 28 causes the A/V signal supplied to the switching stage 26 by the OSD generator means 29 to be applied from the switching stage 26 to the fourth analog connection means 9 as a third A/V signal A/V3.

The video recorder 2 has recorder means 30 which form both recording means and reproducing means. A magnetic-tape cassette, which accommodates a record carrier in the form of a magnetic tape, can be loaded into the recorder means 30. In order to activate a recording mode of the recorder means 30 the second control means 28 can supply recording activation information AAI to the recorder means 30.

The recorder means 30 are adapted to record a recording signal in accordance with the VHS standard (Video Cassette System standard, June 1990) on a magnetic tape in an analog recording mode of the video recorder 2 and adapted to reproduce a reproduction signal in accordance with the VHS standard from the magnetic tape in an analog reproducing mode. The recorder means 30 are adapted to record a recording signal in accordance with the DVHS standard (D-VHS system standard, October 1997) on a magnetic tape in a digital recording mode of the video recorder 2 and to reproduce a reproduction signal in accordance with the DVHS standard from a magnetic tape in a digital reproducing mode.

It is to be noted that the video recorder 2 can be set to a digital recording mode only when a magnetic-tape cassette suitable for recording in accordance with the DVHS standard has been loaded into the recorder means 30. Furthermore, the video recorder 2 can be set to a digital reproducing mode only when a magnetic-tape cassette which complies with the DVHS standard and on whose magnetic tape a recording signal in accordance with the DVHS standard has been recorded has been loaded into the recorder means 30. By means of the keyboard 27 a user of the video recorder 2 can also activate an analog recording mode or preset such a mode when a digital recording mode is possible.

When the video recorder 2 has been set to the digital recording mode A/V signal A/D received from the second data bus means 15 can be applied to an A/V data processing stage 31. A/V data A/D in accordance with the DVHS standard, which data is to be recorded, can be processed in the A/V data processing stage 31 and can be supplied to the recorder means 30 in order to be recorded on a magnetic tape.

When the video recorder 2 is in the digital reproducing mode reproduction signals reproduced from a magnetic tape by the recorder means 30 can be applied to an A/V data processing stage 31. The A/D data processing stage 31 is then adapted to process the applied reproduction signals in a manner as defined in the DVHS standard. Reproduction signals processed by the A/D data processing stage 31 can be applied to the second data bus means 15 as A/V data A/D.

When the video recorder 2 is in the digital reproducing mode the second control means 28 can supply third control information SI3 to the data bus means 15, as a result of which a digital data bus connection to the data bus means 15 is established in order to transfer A/V data supplied by the A/D data processing stage 31 to the first digital connection means 10 of the set top box 1 via the second digital connection means 13. The control means 28 can further supply control data SD to the second data bus means 15 in order to transfer said data to the first digital connection means 10.

When the video recorder 2 is in the analog recording mode an A/V signal supplied by the second tuner 25 or a fourth A/V signal A/V4 applied to the video recorder 2 via the fourth analog connection means 9 can be supplied to an A/V signal processing stage 32. In the A/V signal processing stage 32 the A/V signal to be recorded can be processed in accordance with the VHS standard and can be supplied to the recorder means 30 in order to be recorded on a magnetic tape.

When the video recorder 2 is in the analog reproducing mode reproduction signals reproduced from a magnetic tape by the recorder means 30 can be applied to the A/V signal processing stage 32. The A/V signal processing stage 32 is then adapted to process the applied reproduction signals in a manner defined in the VHS standard. A reproduction signal processed by the A/V signal processing stage 32 can be applied to the switching 26 as an A/V signal.

When the video recorder 2 is in the analog reproducing mode the second control means 28 can supply second switching information UI2 to the switching stage 26 in order to achieve that the A/V signal supplied by the A/V signal processing stage 32 is applied to the fourth analog connection means 9 as a third A/V signal A/V3. When the video recorder 2 is in the analog reproducing mode the second control means 28 can supply second output control information AS2 to pin 8 P4 of the fourth analog connection means 9, in order to characterize the supply of the third A/V signal A/V3 by the fourth analog connection means 9.

A digital reception signal DES from a satellite antenna 34 can be applied to a digital terminal 33 of the set top box 1. Here, a digital reception signal DES complies with a DVB standard (European Telecommunication Standard ETS 300 468). By means of a digital reception signal DES it is possible to transmit an MPEG transport stream containing a plurality of data streams. A data stream then includes audio information and video information and, at option, additional information about a television program.

The set top box 1 has processing means 35 for processing a received digital reception signal DES. The processing means 35 include selection means 36, data stream processing means 37 and decoding means 38. The set top box 1 further has a third keyboard 39 by means of which selection information AI can be applied to the selection means 36.

A digital reception signal DES supplied to the digital terminal 33 can be applied to the selection means 36. As a result of the supply of selection information AI by the third keyboard 39 one of the data streams of a television program in the digital reception signal DES can be selected for further processing by a user of the set top box 1. A selected data stream can be applied from the selection means 36 to the data stream processing means 37 and the first data bus means 12 for transfer to the video recorder 2. A data stream processed in the data stream processing means 37 can be applied to the decoding means 38.

The decoding means 38 are adapted to decode digital audio information and digital video information contained in the processed data stream and to supply an analog fifth A/V signal A/V5 containing audio information and video information.

An MPEG transport stream reproduced by the video recorder 2 and applied to the data bus means 12 via the second digital connection means 13 as A/V data A/D can be applied to the processing means 35 for further processing and for the supply of an analog fifth A/V signal A/V5 containing audio information and video information of the MPEG transport stream.

The set top box 1 further has transfer means 40 adapted to transfer information applied to the first analog connection means 4, the second analog connection means 5, the first digital connection means 10 or the digital terminal 33 and, when necessary, processed by the processing means 35 to respective other connector means of the set top box 1.

For this purpose, the transfer means 40 include the third keyboard 39, a transfer stage 41 and third control means 42. The transfer stage 41 is arranged to receive the first A/V signal A/V1 from the first analog connection means 4, the third A/V signal A/V3 from the second analog connection means 5 and the fifth A/V signal A/V5 supplied by the processing means 35. The transfer stage can transfer an A/V signal applied to the transfer stage 41 to the first analog connection means 4 as the second A/V signal A/V2 and/or to the second analog connection means 5 as the fourth A/V signal A/V4.

The third control means 42 can apply the first output control information AS1 to the pin 8 P1 of the analog connection means 4. From the pin 8 P3 of the second analog connection means 5 the second output control information AS2 can be applied to the third control means 42 and the second output control information AS2 can be applied from the third control means 42 to the pin 8 P3 of the second analog connection means 5.

Furthermore, fourth control information SI4 can be applied from the third control means 42 to the first data bus means 12 so as to establish a data bus connection with isochronous data transfer to the second data bus means 15. The third control means 52 serve to transfer A/V data A/D processed by the processing means 35 or to transfer A/V data A/D received by the second digital connection means 13 of the video recorder 2. Control data SD can be applied from the first data bus means 12 to the third control means 42 and control data SD can be supplied from the third control means 42 to the first data bus means 12.

By the actuation of a key of the third keyboard 39 a user can define which A/V signal applied to the transfer stage 41 is to be supplied to the television set 3 as the second A/V signal A/V2 or to the video recorder 2 as the fourth A/V signal A/V4. Corresponding fifth control information SI5 can be supplied to the third control means 42 by the third keyboard 39 and corresponding sixth control information SI6 can be supplied to the transfer stage 41 by the third control means 42.

It is to be noted that by means of the third keyboard 39 in the set top box 1 and by means of the second keyboard 27 in the video recorder 2 the digital recording mode or the analog recording mode can be defined as the preferred recording mode. The appropriate preferred recording mode information AM can be stored in the second control means 28 and the third control means 42.

It is to be noted that when recording activation information AAI occurs the recorder means 30 are always set to the analog recording mode for the time being and that only when A/V data A/D is received via the isochronous data transfer the second control means 28 can supply appropriate recording activation information AAI for the activation of the digital recording mode.

It is to be noted that the video recorder 2 can be set to a recording mode both by actuation of a recording key of the second keyboard 27 of the video recorder 2 and by actuation of a recording key of the third keyboard 39 of the set top box 1.

It is to be noted that the third control means 42 are adapted to transfer the third A/V signal A/V3 from the second analog connection means 5 and to supply the third A/V signal A/V3 to the first analog connection means 4 as the second A/V signal A/V2 when the second output control information AS2 appears, as is specified in the SCART standard. In the present case, the SCART standard further specifies that the third control means 42 supply the first output control information AS1 to the first analog connection means 4 in order display a third A/V signal A/V3 supplied to the second analog connection means 5 together with the second output control information AS2 by means of the television set 3.

The operation of the set top box 1, of the video recorder 2 and of the television set 3, particularly the transfer of analog A/V signals and digital A/V data A/D, will be elucidated with the aid of four examples of use of the embodiment shown in FIG. 1.

In a first example of use it is assumed that the second control means 28 and the third control means 42 store preferred recording mode information AM identifying the digital recording mode. It is further assumed that the recorder means 30 contain a magnetic-tape cassette suitable for recording in accordance with the VHS standard only, for which reason only an analog recording mode is possible.

In the first example of use a digital reception signal DES is processed by the processing means 35 of the set top box 1 and is applied to the transfer stage 41 as a fifth A/V signal A/V5 and is applied from this stage to the television set 3 as a second A/V signal A/V2. The third control means 42 supply first output control information AS1 to the television set 3, upon which the television program of the digital reception signal DES is displayed by the monitor 21.

It is now assumed that the user wishes to record the television program being displayed by the monitor 21 of the television set 3 by means of the video recorder 2 and actuates a recording key of the second keyboard 27 of the video recorder 2. Subsequently, the second keyboard 27 supplies second control information SI2 to the second control means 28, which second control means 28 supply the recording activation information AAI to the recorder means 30. The recorder means 30 subsequently start to record the A/V signal, which is supplied to the recorder means 30 by the A/V signal processing means 32, in the analog recording mode.

Thereupon, the recorder means 30 supply recording mode information AM to the second control means 28, which information identifies the analog recording mode which is possible with the aid of the recorder means 30. The preferred recording mode information AM stored in the second control means 28, which information identifies the digital recording mode, is replaced by the possible recording mode information AM supplied by the recorder means 30 and representative of the analog recording mode, because it is not possible to record information in accordance with the DVHS standard on the magnetic tape of the magnetic-tape cassette present in the recorder means 30.

Subsequently, the second control means 28 supply the beginning-of-recording information AB to the second data bus means 15 as control data SD. Said control data SD is transferred from the second data bus means 15 to the first data bus means 12 via the cable connection 16 and is supplied to the third control means 42.

When beginning-of-recording information AB appears the third control means 42 supply mode inquiry information as control data SD to the second control means 28 via the data bus means 12 and 15 in order to determine the recording mode which is possible with the aid of the recorder means 30. When mode inquiry information appears the second control means 28 supply the recording mode information AM to the control means 42, which information identifies analog recording mode which is possible and active in the video recorder 2 in the first example of use.

The transfer means 40 are then adapted to transfer the digital reception signal DES processed by the processing means 35 to the first digital connection means 10 as A/V data A/D and/or to transfer the digital reception signal DES processed by the processing means 35 to the second analog connection means 5 as a fifth A/V signal A/V5 when beginning-of-recording information AB which is representative of a recording mode of the video recorder 2 appears and when the first output control information AS1 is present on the pin 8 P1 of the first analog connection means 4.

Advantageously, the third control means 42 recognize by detection of the applied recording mode information AM that the video recorder 2 only allows the analog recording mode and supply sixth control information SI6 to the transfer stage 41 in order to supply the fifth A/V signal A/V5 applied by the processing means 35 to the fourth analog connection means 9 as a fourth A/V signal A/V4 for the purpose of recording by the recorder means 30.

Thus, it is achieved that the analog A/V signal of a television program contained in a digital reception signal DES received by the set top box 1 and displayed by the monitor means 21 of the television set 3 is recorded on a magnetic tape in analog form in accordance with the VHS standard by means of the video recorder 2.

This yields the advantage that, independently of a preceding recording mode, in which possibly an A/V signal from the third tuner 25 or the fourth A/V signal A/V4 or digital A/V data A/D has been recorded, the A/V signal of the television program being displayed by the monitor 21 is recorded by the recorder means 30 when beginning-of-recording information AB appears. In this way, a "record what you see feature" is obtained.

Moreover, the advantage is obtained that a television program being displayed by the television set 3 is recorded in accordance with the DVHS standard or the VHS standard according to the user's wishes (preferred recording mode information) and the given situation (magnetic-tape cassette in the recorder means 30; digital or analog reception signal).

In a second example of use the conditions are the same as assumed in the first example of use but the recorder means 30 contain a magnetic-tape cassette suitable for recording in accordance with the DVHS standard, as a result of which a digital recording mode is possible.

After the actuation of the recording key of the second keyboard 27 of the video recorder 2 by the user the second control means 28 activate the analog recording mode in the recorder means 30. The second control means 28 supply beginning-of-recording information AB to the third control means 42 via the data bus means 15 and 12, which third control means receive recording mode information AB representative of the digital recording mode that is possible from the second control means 28 through the supply of the mode inquiry information to the second control means 28.

The transfer means 40 are now adapted to transfer the digital reception signal DES processed by the processing means 35 to the first digital connection means 10 and/or to transfer the fifth A/V signal A/V5 processed by the processing means 35 to the second analog connection means 5 when beginning-of-recording information AB appears and the first output control information AS1 is present on the pin 8 P1 of the first analog connection means 4.

Advantageously, the third control means 42 recognize by detection of the applied recording mode information AM that the video recorder 2 only allows the digital recording mode and supply fourth control information SI4 to the first data bus means 12 in order to establish a data bus connection with isochronous data transfer to the second data bus means 15. Via the data bus connection the A/V data A/D supplied to the data bus means 12 by the processing means 35 is applied in order to be recorded in the digital recording mode with the aid of the recorder means 30.

Furthermore, the control means 42 supply control data SD to the second control means 28 via the data bus connection in an asynchronous data transfer so as to activate the digital recording mode in the recorder means 30. Since the second control means 28 store the digital recording mode as preferred recording mode information AM the second control means 28 supply recording activation information AAI for the activation of the digital recording mode to the recorder means 30.

This yields the advantage that the audio and video information of the television program being displayed by the television set 3 is recorded by the video recorder 2 as AV data A/D in accordance with the DVHS standard in conformity with the user's wishes and the possibilities of the recorder means 30.

In a third example of use it is assumed that the recorder means 30 contain a magnetic-tape cassette suitable for recording in accordance with the DVHS standard, as a result of which a digital recording mode is possible. The second control means 28 and the third control means 42 store a preferred recording mode AM which represents the analog recording mode, which is why the second control means 28 store possible recording mode information AM which is representative of the analog recording mode.

In the third example of use it is further assumed that the set top box 1 does not supply first output control information AS1 and the monitor 21 of the television set 3 displays a television program contained in the A/V signal supplied by the first tuner 20 of the television set 3. It is now assumed that the user actuates the recording key of the second keyboard 27 and activates the analog recording mode in the video recorder 2.

Thereupon, the second control means 28 supply recording activation information AAI to the recorder means 30 in order to activate the analog recording mode. Subsequently, as set forth hereinbefore, beginning-of-recording information AB and recording mode information AM representative of the analog recording mode that is possible is supplied to the second control means 28 by the third control means 42.

The transfer means 40 are now adapted to transfer the first A/V signal A/V1 supplied to the first analog connection means 4 of the set top box 1 to the second analog connection means 5 when beginning-of-recording information AB appears and in the absence of the first output control information AS1 on the first analog connection means 4. For this, the third control means 42 supply sixth control information SI6 to the transfer stage 41.

Thus, it is achieved that the A/V signal supplied by the tuner 19 of the television program being displayed by means of the monitor 21 is applied from the tuner 19 to the A/V signal processing stage 32 via the third analog connection means 7, the first analog connection means 4, the transfer stage 41, the second analog connection means 5 and the fourth analog connection means 9 and is recorded by the recorder means 30 in accordance with the VHS standard. This has the advantage that the television program being displayed by means of the television set is recorded in the preferred analog recording mode.

It is to be noted that if the preferred recording mode information AM stored in the second control means 28 and that stored in the third control means 42 are different no conflict arises because the preferred recording mode information AM stored in the second control means 28 of the video recorder 2 is given priority.

It is to be noted that the video recorder 2 may have further analog connection means not shown in FIG. 1 to which a further video recorder may be connected. When this further video recorder supplies a further A/V signal and further output control information on its analog connection means this further A/V signal and this further output control information are transferred via transfer means, not shown, of the video recorder 2 as a third A/V signal A/V3 and as second output control information AS2, as specified in the SCART standard. Likewise, the third A/V signal A/V3 and the second output control information AS2 are applied to the television set 3 by the transfer means 40 as a second A/V signal A/V2 and as first output control information AS1 and a television program contained in the second A/V signal A/V2 is displayed by means of the monitor 21.

If the user now actuates the recording key of the second keyboard 27 in order to record the further A/V signal supplied by the further video recorder and containing the television program displayed on the monitor 21 by means of the video recorder 2, the transfer means are adapted to transfer the A/V signal transferred to the television set 3 by the transfer means 40 to the second analog connection means 5 when the beginning-of-recording information AB appears and the first output control information AS1 is present. The further A/V signal supplied to the second analog connection means 5 is then recorded in the analog recording mode of the video recorder 2.

This has the advantage that also in the case of the above described transfer of a further A/V signal from a signal source connected to the video recorder 2 to further analog connection means the A/V signal of the television program being displayed by the television set is recorded by means of the video recorder 2.

In a fourth example of use the video recorder 2 is in the digital reproducing mode and a reproduction signal in accordance with the DVHS standard from a magnetic-tape cassette loaded into the recorder means 30 is supplied to the A/V data processing means 31 by the recorder means 30. The audio and video information of the reproduction signal is applied to the data stream processing means 37 of the processing means 35 as A/V data via the digital connection means 13 and 10.

The processing means 35 supply a fifth A/V signal A/V5, which contains the audio and video information of the reproduction signal, to the transfer stage 41. The transfer stage 41 supplies the fifth A/V signal A/V5 to the first analog connection means 4 as a second A/V signal A/V2 and the third control means 42 supply first output control information AS1 to said analog connection means. The television program contained in the second A/V signal A/V2 is displayed on the monitor 21 of the television set 3.

In the fourth example of use it is now assumed that while the video recorder 2 is in the digital reproducing mode the user wishes the program a recording of a television program which can be received in the form of an analog reception signal AES at a later instant. For this purpose, the user actuates a timer key of the second keyboard 27. In response thereto, the second keyboard 27 supplies corresponding second control information SI2 to the second control means 28.

The second control means 28 are now adapted to supply OSD activation information OI to the OSD generator means 29 when such second control information SI2 appears, which OSD activation information characterizes on-screen display information by means of a which it is possible to program a later recording of a television program. The OSD generator means 29 supply this on-screen display information in the form of an A/V signal to the fourth analog connection means 9 as a third A/V signal A/V3 via the switching stage 26 which is switched over by appropriate second switching information UI2.

The second control means 28 are now adapted to supply second output control information AS2 to the fourth analog connection means 9 when such second control information SI2 appears. In response to the second output control information AS2 the third A/V signal A/V3 is transferred to the television set 3 by the transfer means 40 as a second A/V signal A/V2. When the second output control information AS2 is present the third control means 42 of the transfer 40 supply the first output control information AS1 to the television set 3 via the first analog connection means 4. Subsequently, the monitor 21 of the television set 3 displays the on-screen display information contained in the second A/V signal A/V2 is displayed.

This has the advantage that also when the video recorder 2 is in the digital reproducing mode, in which an isochronous data transfer in accordance with the 1394 standard via the digital connection means 10 and 13 occurs, on-screen display on the television set 3 is possible via the analog connection means of the video recorder 2 and the set top box 1. In an advantageous manner this on-screen display appears automatically on the television set without any settings by the user via the third keyboard 39 of the set top box 1 being required.

It is to be noted that an automatic on-screen display in an advantageous manner as described for the fourth example of use is also possible in the digital recording mode of the video recorder 2.

It is to be noted that digital connection means may also be adapted to establish a data bus connection in accordance with another digital protocol than the digital protocol laid down in the 1394 standard. The digital connection means may then communicate for example in accordance with a digital protocol defined in the AV/C-CTS standard.

It is to be noted that recording means and reproducing means of a video recorder may also be adapted to record and reproduce in accordance with another digital standard, such as for example the DV standard. Likewise, other record carriers are possible, such as for example a hard disk.

It is to be noted that the recording means and reproducing means of a video recorder may also be adapted to record and reproduce in accordance with another analog standard, such as for example the SVHS standard or the High8 standard.

It is to be noted that when an A/V signal containing on-screen display information is supplied during a digital reproducing mode the reproduction of A/V data from the magnetic tape may be interrupted in the same way as in a pause mode.

It is to be noted that by the provision of transcoding means in the processing means digital reception data in accordance with the MPEG standard can be applied to the processing means and can be supplied from the processing means to the video recorder as A/V data in accordance with the DV standard. Thus, it is also possible to connect a video recorder which is exclusively constructed for the reception of A/V data in accordance with the DV standard to the set top box.

What is claimed is:

1. A processing arrangement for processing and transferring analog and digital audio, video and control information, comprising:

first analog connection means and second analog connection means via which analog A/V signals and output control information can be applied to the processing arrangement and can be supplied by the processing arrangements, to which first analog connection means a television set can be connected and to which second analog connection means a recording arrangement can be connected;

digital connection means via which digital A/V data and control data can be applied to the processing arrangement and can be supplied by the processing arrangement, to which digital connection means the recording arrangement can be connected;

processing means for processing information applied from the connection means to the processing arrangement; and transfer means for transferring information applied from connection means to the processing arrangement and, if applicable, processed by the processing means to other connection means of the processing arrangement and for supplying output control information to the first analog connection means, which output control information indicates the supply of an A/V signal by the first analog connection means, wherein:

the transfer means are adapted to transfer information, which information has been processed by the processing means or transferred by the transfer means, to the second analog connection means and/or to the digital connection means when beginning-of-recording information characterizing a recording mode of the recording arrangement occurs and when output control information is present on the first analog connection means; and the transfer means are adapted to transfer an A/V signal supplied to the processing arrangement via the first analog connection means to the second analog connection means when beginning-of-recording information appears and there is output control information at the first analog connection means.

2. A processing arrangement as claimed in claim 1, wherein the recording arrangement can supply recording mode information to the digital connection means, which recording mode information indicates that a digital recording mode or analog recording mode is possible to record information in the recording arrangement.

3. A processing arrangement as claimed in claim 2, wherein the transfer means are adapted to transfer digital A/V data processed in the processing means and control data to the digital connection means when beginning-of-recording information and output control information appear at the first analog connection means and when recording mode information which indicates that the digital recording mode is possible appears, and in that the transfer means is adapted to transfer an A/V signal to the second analog connection means, which last-mentioned A/V signal has been processed in the processing means or has been transferred, when beginning-of-recording information and output control information appears on the first analog connection means and when recording mode information which indicates that the analog recording mode is possible appears.

4. A processing arrangement as claimed in claim 1, wherein the digital connection means include data bus means adapted to establish a data bus connection in accordance with the IEEE-1394 standard to a recording arrangement which can be connected to the digital connection means.

5. A processing arrangement as claimed in claim 4, wherein the processing means are adapted to process A/V data in accordance with the MPEG standard.

6. A processing arrangement as claimed in claim 4, wherein the processing means include transcoding means adapted to receive A/V data in accordance with the MPEG standard and adapted to supply A/V data in accordance with the DV standard.

7. A processing arrangement as claimed in claim 1, wherein the first analog connection means and the second analog connection means are formed by connectors in accordance with the SCART standard and in that the analog connection means are adapted to supply and/or receive output control information via a pin 8 of the first analog connection means and the second analog connection means.

* * * * *